United States Patent
Kobayashi et al.

(10) Patent No.: US 7,913,146 B2
(45) Date of Patent: Mar. 22, 2011

(54) OPTICAL DISK MANUFACTURING METHOD AND DEVICE, OPTICAL DISK, AND REPRODUCTION METHOD THEREOF

(75) Inventors: Shoei Kobayashi, Kanagawa (JP); Seiji Kobayashi, Kanagawa (JP); Tamotsu Yamagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 908 days.

(21) Appl. No.: 11/814,751

(22) PCT Filed: Jan. 31, 2006

(86) PCT No.: PCT/JP2006/301537
§ 371 (c)(1),
(2), (4) Date: Jul. 25, 2007

(87) PCT Pub. No.: WO2006/080521
PCT Pub. Date: Aug. 3, 2006

(65) Prior Publication Data
US 2009/0010117 A1 Jan. 8, 2009

(30) Foreign Application Priority Data
Jan. 31, 2005 (JP) ................ 2005-024525

(51) Int. Cl.
*H03M 13/00* (2006.01)
(52) U.S. Cl. ........................ 714/755; 714/770
(58) Field of Classification Search .......... 714/770, 714/755
See application file for complete search history.

(56) References Cited

U.S. PATENT DOCUMENTS

| | | | | |
|---|---|---|---|---|
| 5,017,883 A * | 5/1991 | Divsalar et al. | ............... | 329/304 |
| 5,023,889 A * | 6/1991 | Divsalar et al. | ............... | 375/244 |
| 5,644,592 A * | 7/1997 | Divsalar et al. | ............... | 375/147 |
| 6,023,783 A * | 2/2000 | Divsalar et al. | ............... | 714/792 |
| 6,212,659 B1* | 4/2001 | Zehavi | ............... | 714/755 |
| 6,233,598 B1* | 5/2001 | Kertis | ............... | 708/819 |
| 6,957,375 B2* | 10/2005 | Richardson | ............... | 714/752 |
| 7,188,295 B2* | 3/2007 | Van Dijk et al. | ............... | 714/755 |
| 7,237,171 B2* | 6/2007 | Richardson | ............... | 714/752 |
| 2003/0108116 A1* | 6/2003 | Kwon et al. | ............... | 375/265 |
| 2004/0243258 A1* | 12/2004 | Shattil | ............... | 700/73 |
| 2006/0107130 A1* | 5/2006 | Baker et al. | ............... | 714/710 |
| 2006/0218645 A1* | 9/2006 | Newman | ............... | 726/26 |
| 2007/0124652 A1* | 5/2007 | Litsyn et al. | ............... | 714/776 |
| 2008/0095121 A1* | 4/2008 | Shattil | ............... | 370/335 |

(Continued)

FOREIGN PATENT DOCUMENTS
JP  11 86436  3/1999
(Continued)

*Primary Examiner* — M. Mujtaba K Chaudry
(74) *Attorney, Agent, or Firm* — Oblon, Spivak, McClelland, Maier & Neustadt, L.L.P.

(57) ABSTRACT

Optical discs are adapted to be used with a light beam having a wavelength of 405 nm for recording or reproducing data. Error correcting blocks for recording BMID including copy protection key information are defined on optical discs (1) dedicated to data reproduction. A data string of BMID to be recorded has 64 bytes. An error correcting block is constituted by 304 columns of error correcting code words (LDC). A BMID data string of 64 bytes is inserted to predetermined 64 error correcting code words (LDC) of a block (304 columns of error correcting code words). The total code length of the predetermined 64 error correcting code words (LDC) is 248 bytes, of which a predetermined byte (symbol) is replaced by a predetermined byte (symbol) of the BMID data string.

19 Claims, 15 Drawing Sheets

U.S. PATENT DOCUMENTS

2009/0231985 A1* 9/2009 Senshu .................. 369/275.3

FOREIGN PATENT DOCUMENTS

| JP | 11 154375 | 6/1999 |
| JP | 11 213554 | 8/1999 |
| JP | 2000 3560 | 1/2000 |
| JP | 2000 207829 | 7/2000 |
| JP | 2002 521789 | 7/2002 |
| JP | 2003 151210 | 5/2003 |
| JP | 2004 22104 | 1/2004 |

* cited by examiner

OPTICAL DISK MANUFACTURING METHOD AND DEVICE, OPTICAL DISK, AND REPRODUCTION METHOD THEREOF

TECHNICAL FIELD

The present invention relates to a method and an apparatus for manufacturing an optical disc carrying additional information such as copy protection key information recorded thereon, an optical disc carrying additional information such as copy protection key information recorded thereon and a method and an apparatus of replaying an optical disc carrying additional information such as copy protection key information recorded thereon.

The present invention contains subject matter related to Japanese Patent Application JP 2005-24525 filed in the Japanese Patent Office on Jan. 31, 2005, the entire contents of which are incorporated herein by reference.

BACKGROUND ART

Read-only type optical discs such as CDs (compact discs) and DVDs (digital versatile discs) are widely known as information recording mediums that can record digitized information on copyrighted works such as audio works including pieces of music and video works.

An optical discs such as a CD or and a DVD records digitized information on the contents of one or more than one copyrighted works on the disc-shaped substrate thereof as a pattern of recessed and projecting bits that corresponds to the work or works. Optical discs of the type under consideration are accompanied by a problem from the viewpoint of copyright protection because the data recorded on an optical disc can be reproduced and recorded on a hard disc and then on write once read many type recording mediums to produce so-called casual copies.

Techniques have been proposed to prevent such casual copies by recording copy protection key information on an optical disc and allowing only authorized apparatus that can decode the copy protection key information to reproduce contents data from the optical disc. Known techniques of this type include those disclosed in Jpn. Pat. Appln. Laid-Open Publications Nos. 2004-63008 and 9-128890 (Hei).

DISCLOSURE OF THE INVENTION

Problems to be Solved by the Invention

Meanwhile, recording mediums having an improved recording density and an increased recording capacity relative to CDs and DVDs have been proposed in the field of optical discs. Such proposed recording mediums include optical discs designed to operate with a beam of light having a wavelength of 405 nm for recording or reproducing data. One example of such optical discs are Blu-ray™ discs. When optical discs having such an increased recording capacity are used to illegally copy data, the loss to copyrighters will be enormous if compared with CDs and DVDs. Therefore, reliable copy protection measures need to be taken.

Thus, it is the object of the present invention to provide a method and an apparatus for manufacturing an optical disc carrying additional information such as copy protection key information recorded thereon, an optical disc carrying additional information such as copy protection key information recorded thereon and a method and an apparatus of replaying an optical disc carrying additional information such as copy protection key information recorded thereon.

In an aspect of the present invention, there is provided a method of manufacturing an optical disc carrying a recorded data sequence produced by executing an error correction coding process and subsequently a modulation process on user data, the method comprising: a first error correction coding step of generating first error correcting code words, each including a user data of a predetermined number of bytes and an error correcting code for it, by executing an error correction coding process on the user data of a predetermined number of bytes; a blocking process of producing a recording/reproduction unit by blocking the first error correcting code words by a predetermined number; a second error correction coding step of generating second error correcting code words including additional information and an error correcting code for it by executing a coding process identical with the user data correction coding process on the additional information; a replacement step of replacing the symbol at a predetermined position in a specific recording/reproduction unit with a symbol contained in the second error correcting code word; a modulation step of executing a modulation process on the recording/reproduction unit; and a production step of producing an optical disc carrying the modulated recording/reproduction unit recorded thereon so as to have the specific recording/reproduction unit containing the second error correcting code word recorded in a predetermined region dedicated to reproduction.

In another aspect of the present invention, there is provided an apparatus for manufacturing an optical disc carrying a recorded data sequence produced by executing an error correction coding process and subsequently a modulation process on user data and dedicated to reproduction, the apparatus comprising: a first error correction coding section that generates first error correcting code words, each including a user data of a predetermined number of bytes and an error correcting code for it, by executing an error correction coding process on the user data of a predetermined number of bytes; a blocking means for producing a recording/reproduction unit by blocking the first error correcting code words by a predetermined number; an additional information generating section that generates additional information to the user data; a second error correction coding section that generates second error correcting code words, each including the additional information and an error correcting code for it, by executing a coding process identical with the user data correction coding process on the additional information; and a replacement section that replaces the symbol at a predetermined position in a specific recording/reproduction unit with a symbol contained in the second error correcting code word.

In still another aspect of the present invention, there is provided an optical disc carrying a bit sequence recorded thereon, the bit sequence being generated by generating first error correcting code words, each including a user data of a predetermined number of bytes and an error correcting code for it, by executing an error correction coding process on the user data of a predetermined number of bytes, producing a recording/reproduction unit by blocking the first error correcting code words by a predetermined number, generating second error correction code words including additional information and an error correcting code for it by executing a coding process identical with the user data correction coding process on the additional information, replacing the symbol at a predetermined position in a specific recording/reproduction unit with a symbol contained in the second error correcting code word and executing a modulation process on the recording/reproduction unit; the specific recording/reproduction unit containing the second error correcting code word being recorded in a predetermined region dedicated to reproduction.

In still another aspect of the present invention, there is provided an optical disc replay apparatus comprising: a reproduction means for reproducing a signal from an optical disc carrying a bit sequence recorded thereon, the bit sequence being generated by generating first error correcting code words, each including a user data of a predetermined number of bytes and an error correcting code for it, by executing an error correction coding process on the user data of a predetermined number of bytes, producing a recording/reproduction unit by blocking the first error correcting code words by a predetermined number, generating second error correction code words including additional information and an error correcting code for it by executing a coding process identical with the user data correction coding process on the additional information, replacing the symbol at a predetermined position in a specific recording/reproduction unit with a symbol contained in the second error correcting code word and executing a modulation process on the recording/reproduction unit, the specific recording/reproduction unit containing the second error correcting code word being recorded in a predetermined region dedicated to reproduction; a demodulation circuit that executes a demodulation process corresponding to the modulation process on the signal reproduced by the reproduction means to generate recording/reproduction units; and a control section that executes an error correction decoding process and an additional information decoding process.

The control section is adapted to output data by executing an error correction decoding process on each first error correcting code word for the modulated recording/reproduction unit when outputting the user data but extract a second error correcting code word from a predetermined position of a specific recording/reproduction unit in a state of not being subjected to an error correction decoding process, execute an error correction decoding process on the extracted second error correcting code word and extract the data obtained by the error correction decoding process when outputting the additional information.

In a further aspect of the present invention, there is provided an optical disc replay method comprising: reproducing a signal from an optical disc carrying a bit sequence recorded thereon, the bit sequence being generated by generating first error correcting code words, each including a user data of a predetermined number of bytes and an error correcting code for it, by executing an error correction coding process on the user data of a predetermined number of bytes, producing a recording/reproduction unit by blocking the first error correcting code words by a predetermined number, generating second error correction code words including additional information and an error correcting code for it by executing a coding process identical with the user data correction coding process on the additional information, replacing the symbol at a predetermined position in a specific recording/reproduction unit with a symbol contained in the second error correcting code word and executing a modulation process on the recording/reproduction unit, the specific recording/reproduction unit containing the second error correcting code word being recorded in a predetermined region dedicated to reproduction; executing a demodulation process corresponding to the modulation process on the reproduced signal; and executing an error correction decoding process; on each first error correcting code word for the modulated recording/reproduction unit to output data when outputting the user data; and extracting a second error correcting code word from a predetermined position of a specific recording/reproduction unit in a state of not being subjected to an error correction decoding process, executing an error correction decoding process on the extracted second error correcting code word, and extracting the data obtained by the error correction decoding process, when outputting the additional information.

Thus, according to the present invention as defined above, it is possible to strongly protect the contents data recorded on an optical disc against illegal copying.

BEST MODE FOR CARRYING OUT THE INVENTION

Now, the present invention will be described in greater detail by referring to the accompanying drawings that illustrate preferred embodiments of the invention.

Physical Characteristics of Optical Disc and BMID

Now, the basic physical characteristics of an optical disc 1 according to the present invention will be described below.

Figure 1:
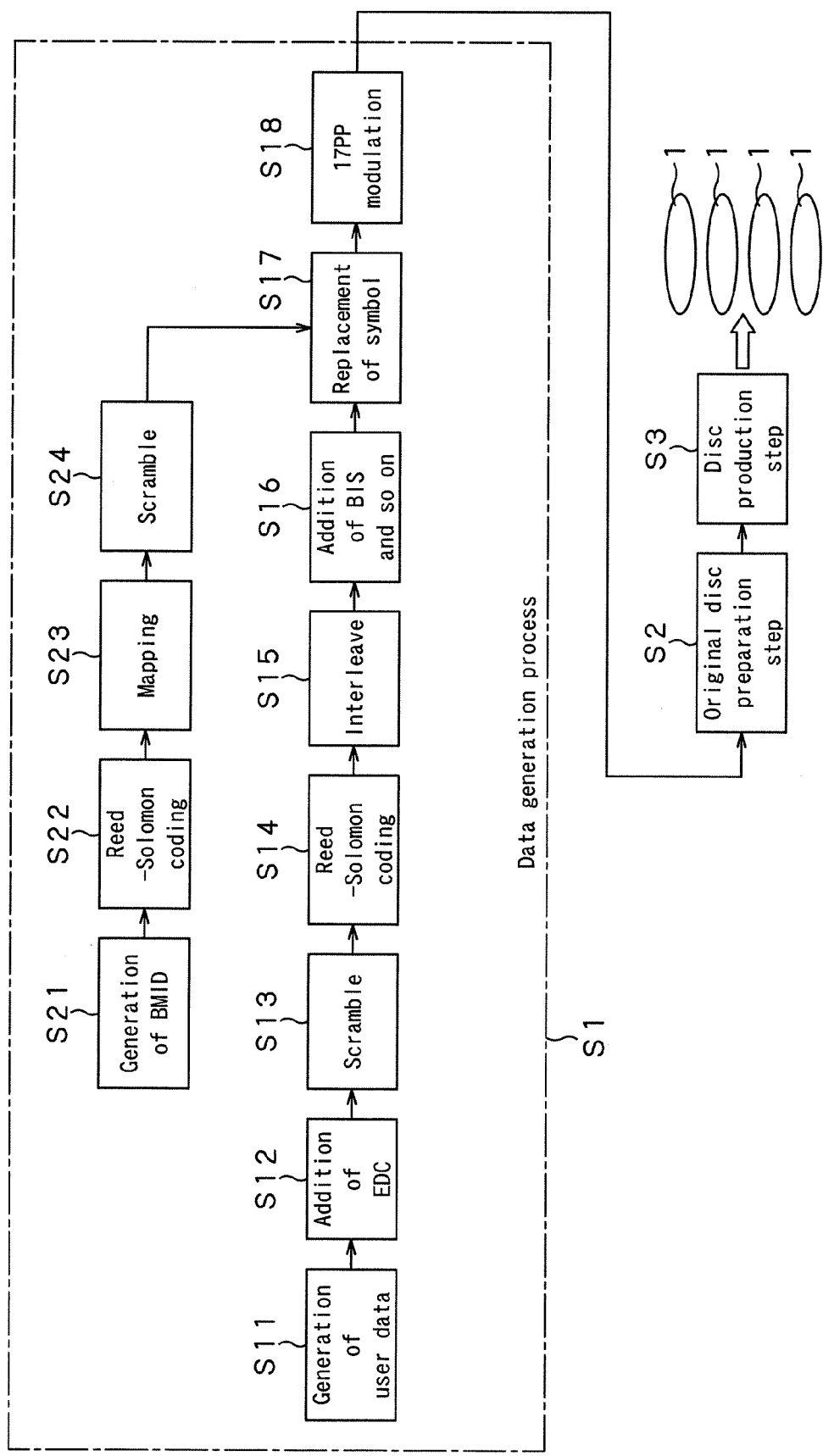
FIG. 1 is a flowchart illustrating the steps of manufacturing an optical disc according to the present invention.

A light beam with a wavelength of 405 nm is used for the optical disc 1 to record or reproduce data. The disc may, as an example, be a Blu-ray™ disc. The optical disc 1 illustrated in FIG. 1 is a disc dedicated for reproduction of data and the user cannot write any data to it. The optical disc 1 has a radius R of 60 mm and a thickness d of 12 mm. A light beam that is a purple-blue laser beam having a wavelength of 405 nm is used for reproduction of recorded data. The objective lens for focusing the light beam emitted from a light source onto the optical disc 1 typically has a numerical number (NA) of 0.85.

Copy protection key information is recorded on the optical disc 1. The copy protection key information is used for an authentication process that is executed when the information recorded on the optical disc 1 is reproduced or copied to some other recording medium such as hard disc. For example, a disc drive apparatus authorizes the user to reproduce or copy the information recorded on the optical disc 1 when the copy protection key information read out from the optical disc 1 and the copy protection key information inputted by the user by way of an input device agree with each other. Therefore, it is possible to prohibit the reproduction or the copying of the recorded information if the user does not recognize the right copy protection key information or the optical disc is produced illegally and does not carry right copy protection key information recorded on it. In other words, it is possible to protect the copyright for the contents recorded on the optical disc 1 when copy protection key information is recorded on the optical disc 1.

In the following description, the copy protection key information recorded on the optical disc 1 is referred to simply as BMID.

Method of Manufacturing Optical Disc

Now, the method of manufacturing an optical disc 1 will be described below.

FIG. 1 is a flowchart illustrating the steps of manufacturing an optical disc 1.

The steps of manufacturing an optical disc 1 include a data generation step S1, an original disc preparation step S2 and a disc production step S3.

In the data generation step S1, a bit sequence (a land-pit pattern) that corresponds to the data to be recorded on the optical disc 1 is generated.

In the original disc preparation step S2, a pattern of recesses and projections are formed along the recording track or tracks of a raw glass disc carrying a photo-resist layer applied to it by irradiating a laser beam, controlling the oscillation of the laser by means of a control signal that corresponds to the data of the bit sequence (the land-pit pattern) generated in the data generation step S1. Subsequently, the resist where the pattern of recesses and projections is recorded is developed and fixed on the raw disc and the surface of the raw disc is subjected to electrolytic plating to produce a metal original disc.

In the disc production step S3, a stamper is prepared on the basis of the prepared metal original disc and a disc substrate that has a bit sequence corresponding to the data and is produced thereon is formed by injection molding of injecting transparent resin such as polycarbonate by means of an injection molding machine having a metal mold in which the stamper is arranged. Then, the optical disc 1 is formed by subjecting the disc substrate to a process of forming a reflection film and a protection film thereon.

(Overall Flow of Data Generation Step S1)

Now, the processing steps of the data generation step S1 will be described in detail below.

The data generation step S1 includes processing steps including Steps S11 through S18 and S21 through S24 shown in FIG. 1.

Firstly, in Step S11, the file data, the contents data such as audio contents data and/or video contents data and various control data (to be referred to collectively as user data hereinafter) are generated.

Then, in Step S12, the user data are divided into data groups, each having data of 64 k bytes, and each of the data groups is further divided into 32 data groups, each having data of 2,048 bytes. An error correcting code (EDC) of 4 bytes is added to each data group (user data) of 2,048 bytes to produce 32 data groups of 2,052 bytes.

Subsequently, in Step S13, the 32 data groups of 2,052 bytes are scrambled in a predetermined manner.

Thereafter, in Step S14, the scrambled data group of 32×2,052 bytes is divided into blocks of 216 bytes×304 columns and a Reed-Solomon coding process is executed on the user data of each row (a data column of 216 bytes) and a 32 bytes error correcting code is added to each code column. As a result, blocks, each having 248 bytes×304 columns, are formed.

Subsequently, in Step S15, the blocks of 248 bytes×304 columns are interleaved in a predetermined way for rearrangement.

Then, in Step S16, a frame sync and a BIS are inserted into each data group that is interleaved in a predetermined way to produce an error correcting block (ECC cluster) of 155 rows (excluding the frame sync)×496 bytes rows.

A BMID is also generated in the data generation step S1.

Firstly, in Step S21, reservation information and dummy data are added to a 128-bit BMID to produce a BMID data string. In Step S22, a Reed-Solomon coding process is executed on the BMID data string to add an error correcting code (ECC) to it. Subsequently, in Step S23, the BMID data string having an error correcting code added thereto is mapped to a data frame of 32×2,052 bytes. Then, in Step S24, a scrambling process similar to that of Step S13 is executed on the BMID data string mapped to a data frame of 32×2,052 bytes.

Thereafter, in Step S17, the byte data (symbol) at a predetermined position in a specific one of the error corrected blocks (the ECC clusters) generated in Step S16 is replaced by the symbol of the BMID data string that contains BMID and is generated in Step S24.

Finally, in Step S18, the generated all the error correcting blocks are subjected to a 1-7 parity preserving modulation and an NRZI conversion to produce a bit sequence (a land-bit pattern) to be formed on the recording track or tracks of the optical disc 1.

(Scrambling Process)

Now, the scrambling process (Step S13, Step S24) will be described below.

In the scrambling process, each data group of 32×2,052 bytes is treated as a single block (data frame) and subjected to a scrambling process on a block by block (data frame by data frame) basis.

The algorithm to be used for the scrambling process is a polynomial expressed by the formula (11) shown below.

$$\emptyset(x)=X^{16}+X^{15}+X^{13}+X^{4}+1 \tag{11}$$

More specifically, the scrambling process is executed by a scrambling circuit 10 including a shift register 11 of 16 digits (S0, S1, S2, . . . , S14, S15) with a unit of bit, a first EX-OR circuit 12 for computing EX-OR of the output value of the 15th digit (S14) and the output value of the 16th digit (S16), a second EX-OR circuit 13 for computing EX-OR of the output value of the 13th digit (S13) and the output value of the first EX-OR circuit 12 and a third EX-OR circuit 14 for computing EX-OR of the output value of the 4th digit (S3) and the output value of the second EX-OR circuit 13.

Each bit register (Sx) {x=an integer from 0 to 15} of the shift register 11 shifts the bit value it holds in the inside of the bit register of the next digit (Sx+1). Note that the scrambling circuit 10 stores the output value of the third EX-OR circuit 14 in the bit register of the first digit (S0) of the bit shift register 11 of the scrambling circuit 10.

The scrambling circuit 10 scrambles each of the data groups of 2,052 bytes.

The scrambling circuit 10 repeats the operation of an 8-bit shift for each byte of the user data or the BMID data string. Each time the scrambling circuit 10 performs an 8-bit shift, a byte of the user data or the BMID data string is loaded on the 8 bits (S8 through S15) of the latter half digits of the shift register 11 on a parallel load basis and the scrambled data are output from the 8 bits (S0 through S7) of the former half digits of the shift register 11 on a parallel output basis. The scrambling circuit 10 repeats the 8-bit shift for 2,051 times and outputs the data (a byte) to a total of 2,052 bytes after the scramble.

Figures 2A, 2B:
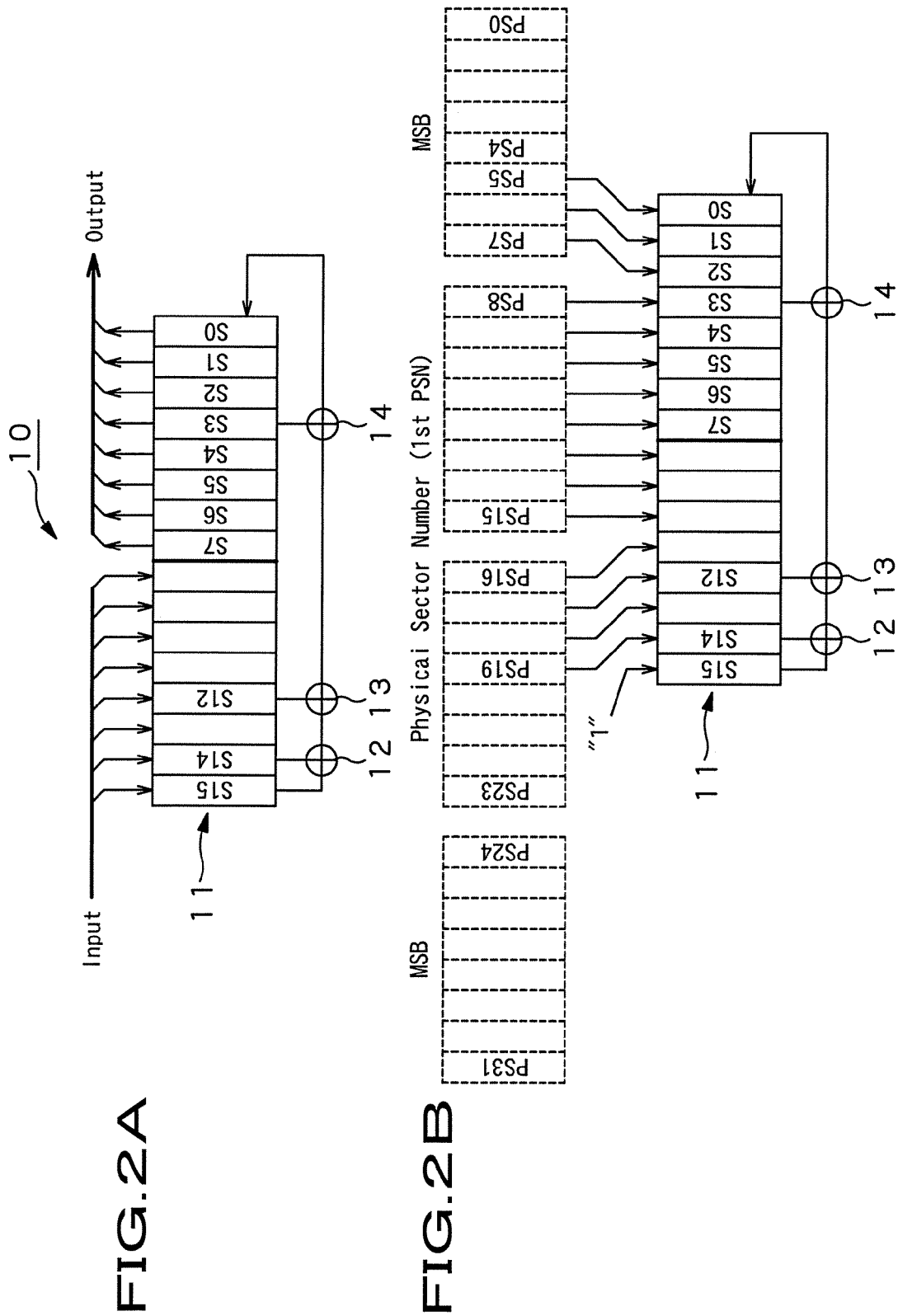
FIGS. 2A and 2B are schematic illustrations of a scramble circuit.

The physical sector number (PSN) of the sector where the user data or the BMID data string is written is used for the initial value (the seed for the scramble) of the shift register 11. The physical sector number (PSN) is represented by four bytes but the value to be preset as initial value is only a part thereof. More specifically, 6LSB through 20LSB (PS5 through PS19) of the physical block number (PSN) are preset in the bit registers (S0 through S14) and "1" is present in the bit register (S15) as shown in FIG. 2B. Thus, the output values of the bit registers (S0 through S7) immediately after the preset constitute the data of the first byte after the first scramble and the output value of the bit registers (S0 through S7) after the bit shift of eight bits constitutes the data of the second byte.

Note that the sector size is 2 k bytes. Therefore, a block (a data group of 32×2,052 bytes) is recorded in 32 sectors. However, the value to be preset as initial value (the seed for the scramble) for a single block (data for 32 sectors) is always the physical block number (PSN) of the leading sector.

(Error Correction Coding Process)

Now, the error correction coding process (Step S14, Step S22) for the user data and the BIS will be described below.

Figure 3:
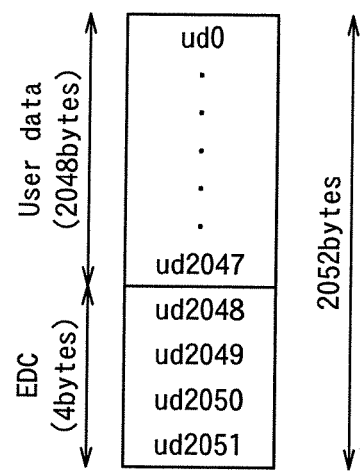
FIG. 3 is a schematic illustration of the format of a user data to which an error detection code (EDC) is added.

The user data is a data unit of 2,052 bytes as shown in FIG. 3. The data unit of 2,052 bytes is formed by a user data of 1 sector (2,048 bytes) and an EDC (error detection code) of 4 bytes added to the user data. A data group (data frame) is formed by 32 data of 2,052 bytes.

In the error correction coding step, the data of 32×2,052 bytes are divided into 216 bytes×304 columns and each column (216 bytes) is subjected to a coding process of RS (248, 216, 33) to generate an error correcting code (ECC) of 32 bytes. In other words, the user data is subjected to a coding process of generating a Reed-Solomon code of a total code length of 248 symbols, an effective data length of 216 symbols and a distance of 33. The error correcting code (ECC) of 32 bytes is added to follow the user data of 216 bytes.

Figure 4:
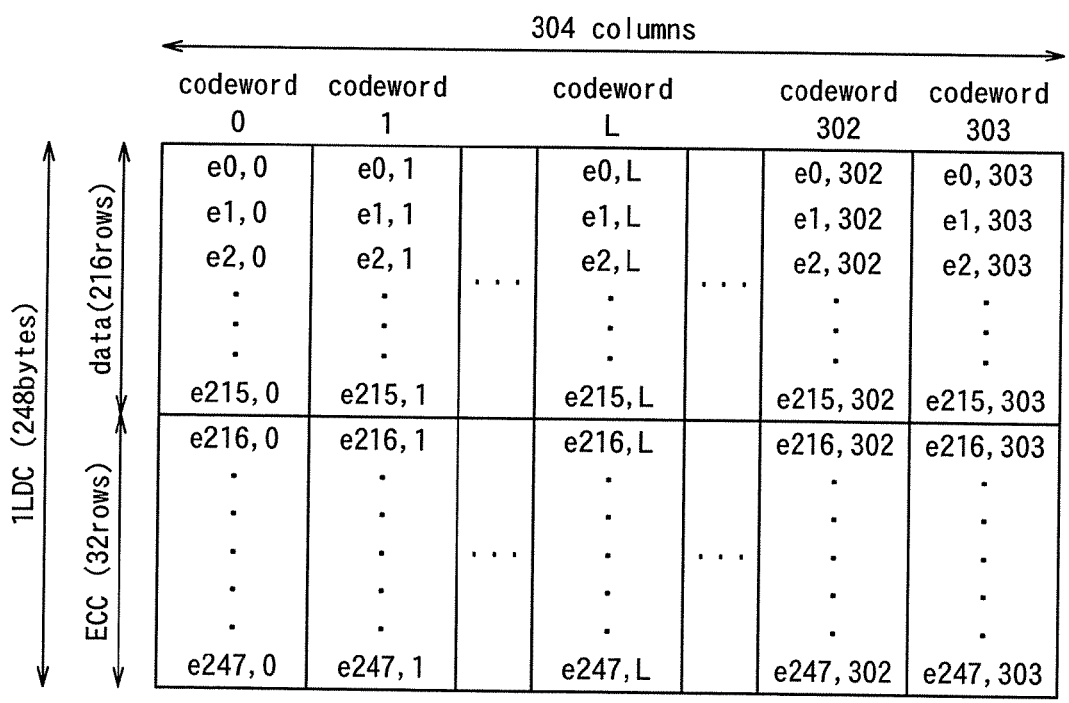
FIG. 4 is a schematic illustration of the format of a user data to which an error correcting code (ECC) is added.

Therefore, the code length of the error correcting code word (LDC) is 248 symbols (bytes) and an error correcting code word (LDC) of 304 (columns) is generated in a data frame as shown in FIG. 4.

A BIS is formed by a data of 720 bytes. In the error correction coding process step, the BIS data of 720 bytes is divided into 30 bytes×24 columns and each column (of 30 bytes) is subjected to a coding process of RS (62, 30, 33) to generate an error correcting code (ECC) of 32 bytes. Thus, the BIS is subjected to a coding process of generating a Reed-Solomon code of a code length of 60 symbols, an effective data length of 30 symbols and a distance of 33. The error correcting code (ECC) of 32 bytes is added to follow the user data of 30 bytes.

Figures 5, 6:
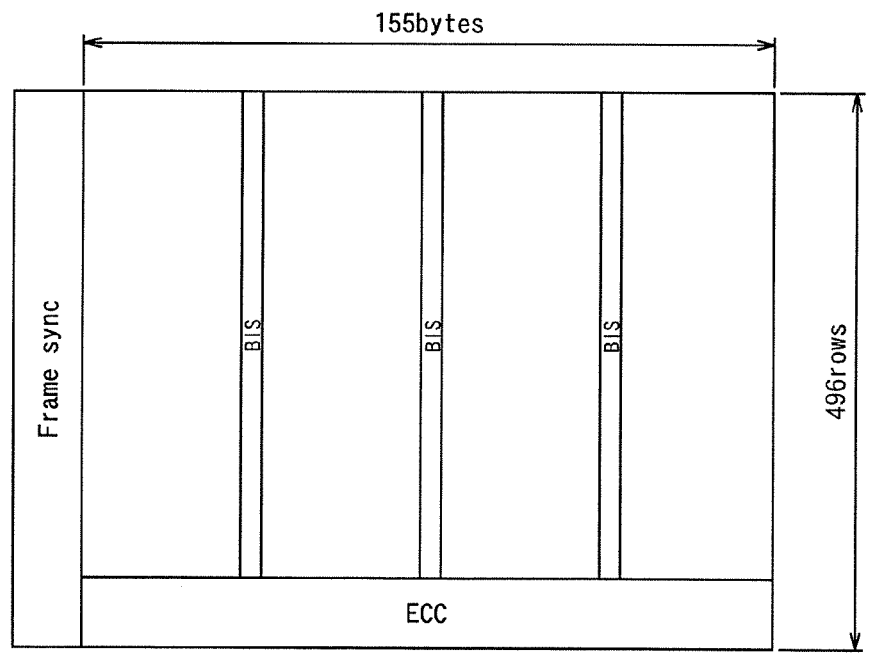
FIG. 5 is a schematic illustration of the format of BIS.
FIG. 6 is a schematic illustration of the data configuration of a physical cluster.

Therefore, the code length of the error correcting code word is 62 symbols (bytes) and an error correcting code word of 24 columns is generated in a data frame as shown in FIG. 5.

(Interleave Process and Frame Structure)

Now, the interleave process and the frame configuration process (Step S15, Step S16) will be described below.

The error correcting code word (LDC) of the user data that has been subjected to an error correction coding process is then subjected to a first interleave process and subsequently to a second interleave process. Thereafter, a BIS and a frame sync are inserted and the LDC is converted to have a data structure as shown in FIG. 6. Note that in the data structure of FIG. 6, the unit of data of 155 bytes in the direction of the rows is referred to as frame.

In the first interleave process, firstly an interleave process is executed on the error correcting code word (LDC) within the range of 2 symbols for the interleave length in such a way that the even-numbered symbols such as 0, 2, 4, . . . of FIG. 4 are located in the 0-th, 2-nd and 4-th frames (as viewed in the row direction in FIG. 6) and the odd-numbered symbols such as 1, 3, 5, . . . of FIG. 4 are located in the 1-st, 3-rd and 5-th frames (as viewed in the row direction of FIG. 6).

In the second interleave process, each of the symbols that are rearranged in the first interleave process is interleaved to the left side. The quantity of interleave varies as a function of the frame position. More specifically, when the frame number is N (the uppermost frame in FIG. 6 having a frame number of 0), each of the symbols of the N-th frame is shifted to the left side by (N×quotient of (0–495)/2)×3. In other words, each of the symbols with the frame numbers of 0 and 1 is shifted leftward by 0 symbols and each of the symbols with the frame numbers 2 and 3 is shifted leftward by 3 symbols, whereas each of the symbols with the frame numbers 4 and 5 is shifted leftward by 6 symbols.

As a result of the above-described interleave process, a frame is formed by data of 38 bytes×4 (=152 bytes) and 496 frames are formed in a block.

After configuring the 496 frames in the above-described manner, a frame sync and a BIS are inserted.

The frame sync is a frame synchronization signal and is located at the head of each frame (155 bytes (as viewed in the row direction in FIG. 6)).

A BIS is inserted by 1 byte into every 38 bytes of each frame except the frame sync. The BIS contains address information and so on. The address is used when no address information is provided by a wobble group on a ROM disc or the like.

An error correcting code having an error correcting capability that is much more excellent than the error correcting code of the user data (LDC) is added to a BIS so that practically all the errors will be corrected. For this reason, the symbols of a BIS from which one or more than one errors are detected can be used in the following manner. When the ECC is used for decoding, the BIS is decoded firstly. When both of two adjacent BISs or frame syncs have one or more than one errors, the user data of 38 bytes sandwiched between them is regarded as burst error. Then, an error pointer is added to the user data of 38 bytes. The user data makes a pointer erasure correction, using the error pointer. Thus, it is possible to improve the error correcting capability of the user data.

(Error Correction Coding Format of BMID)

Now, the error correction coding format of BMID (Step S21, Step S22) will be described below.

BMID has 128 bits (16 bytes).

Figure 7:
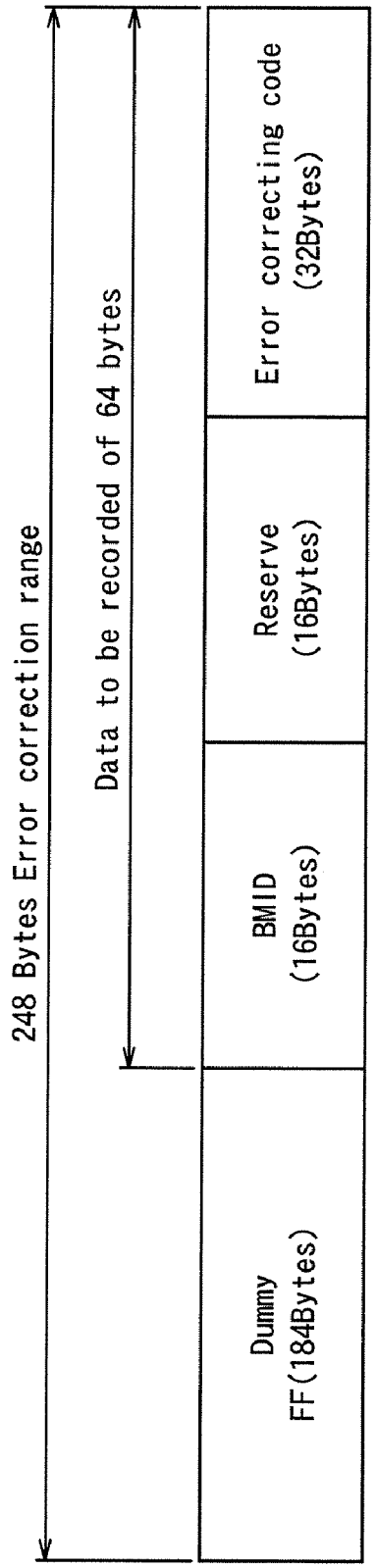
FIG. 7 is a schematic illustration of the format of BUID.

BMID is subjected to an error correction coding process as shown in FIG. 7. More specifically, an error correcting code of 32 bytes is added to a data string of 216 bytes including dummy data of 184 bytes (all FFh), BMID (16 bytes) and reserve data (16 bytes).

With the BMID, a coding process of RS (248, 216, 33) is executed on the 216 bytes. In other words, a Reed-Solomon coding process is executed with a total code length of 248 symbols, an effective data length of 216 symbols and a distance of 33. The error correcting code is same as the error correcting code of the user data (LDC). Therefore, the hardware that operates for error correction coding of BMID can use a core block same as the hardware of the user data (LDC) to provide an advantage of cost reduction.

When recording BMID, a data of 64 bytes is recorded to except the dummy data of 148 bytes. Since it is known that the dummy data are all FFh, the error correcting capability is that of RS (64, 32, 33) so that consequently it is possible to produce an error correcting code having a strong error correcting capability.

The data string of the 64 bytes is referred to as BMID data string.

Such BMID is assigned to a data frame of 32×2,052 bytes once and subsequently subjected to a scrambling process.

(BMID Symbols Replacing Process)

Now, a process of replacing BMID symbols (Step S17) will be described below.

A BMID data string of 64 bytes is recorded in a specific error correcting block. Furthermore, the BMID data string of 64 bytes is recorded in the specific error correcting block as a result of that symbols of the BMID data string are replaced by the data of specific positions in the error correcting block.

Figure 8:
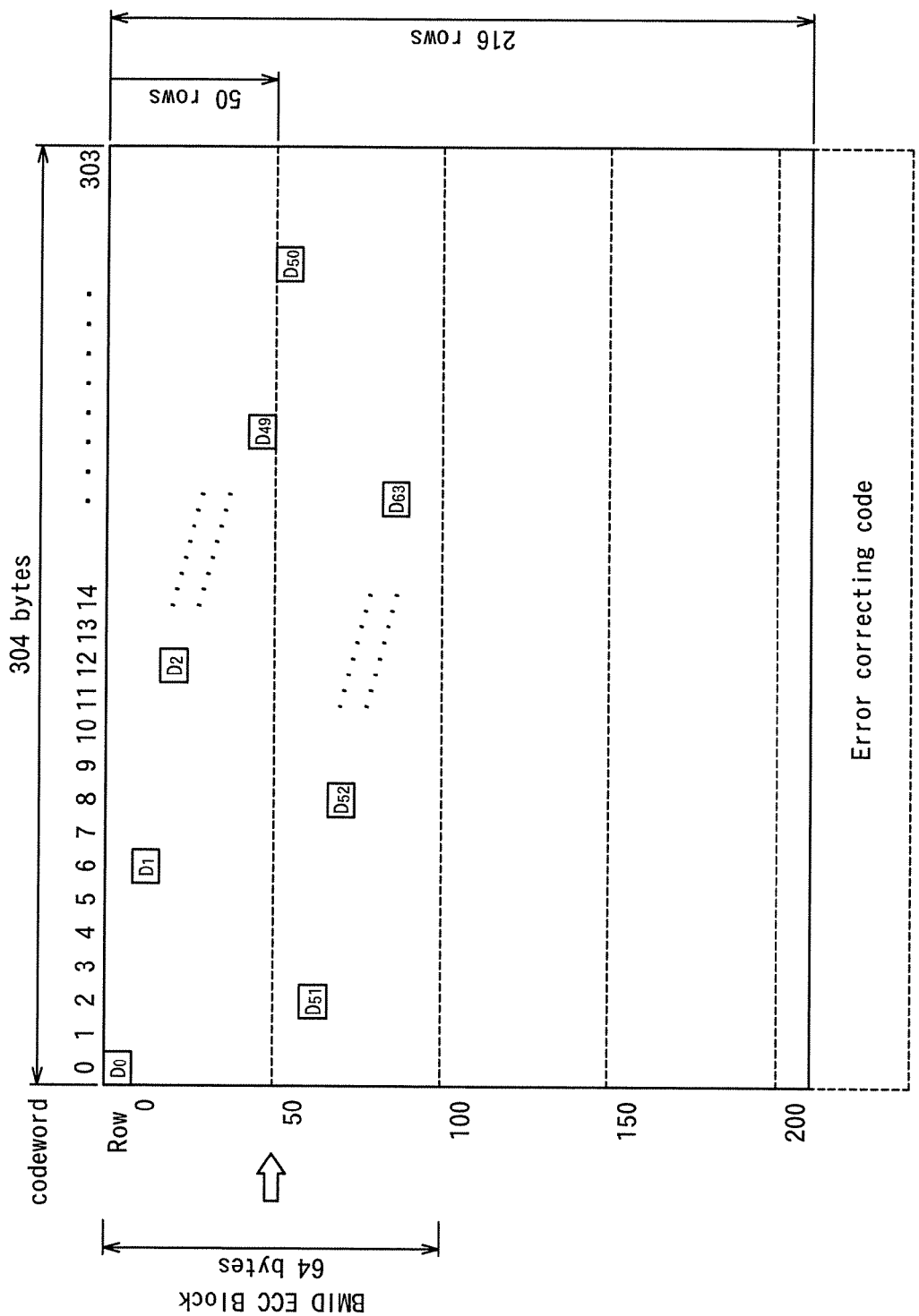
FIG. 8 is a schematic illustration of specific positions where BMID is replaced on an error correcting code, LDC of user data.

FIG. 8 is a schematic illustration of specific positions where BMID is replaced on an error correcting code word (LDC). As shown in FIG. 8, an error correcting code block of a user data is constituted by 304 (columns) of error correcting code words (LDC). A BMID data string of 64 bytes is inserted into predetermined 64 error correcting code words (LDC) of a block (304 (columns) of error correcting code words).

The total code length of the predetermined 64 error correcting code words (LDC) is constituted by 248 bytes, of which a predetermined byte (symbol) is replaced by a predetermined byte (symbol) of the BMID data string.

For example, the symbol (D0) of the 1-st byte of the BMID data string is replaced by the symbol of the 1-st byte (Row=0) of the 1-st error correcting code word (LDC) (codeword=0) and the symbol (D1) of the 2-nd byte of the BMID data string is replaced by the symbol of the 2-nd byte (Row=1) of the 7-th error correcting code word (codeword=6), whereas the symbol (D2) of the 3-rd byte of the BMID data string is replaced by the symbol of the 3-rd byte (Row=2) of the 13-th error correcting code word (code word=12).

Differently stated, the symbol $(D_{x-1})$ of the X-th byte (X=a natural number) of the BMID data string is replaced by the symbol of the X-th byte (Row=X−1) of the Y-th error correcting code word (codeword=Y−1). Note that Y=(residue of (X−1×6)/304).

Thus, as a result of replacing the BMID data string in this way, the BMID data string is inserted to the positions of the leading symbols (the symbols immediately after the frame syncs) of the frames of the 1-st row, the 3-rd row, the 5-th row, . . . , 127-th row after the interleave process.

In other words, the BMID data string is used to replace the specific positions of a specific error correcting block in such a way that the number of symbols of the BMID data string contained in one of the error correcting code words (LDC) of the user data is 1 at most.

As a result of inserting the BMID data string, it is only necessary to execute an error correcting process on the error correcting code words (LDCI) of the user data. In other words, the symbols replaced by the BMID are extinguished as a result of the error correcting process.

On the other hand, when reproducing the BMID data string, the error correcting code words (LDC) of the user data are not subjected to any error correcting process.

Then, as a result, it is possible to record the user data without causing BMIDs to interfere with each other.

(Disc Layout)

Figure 10:
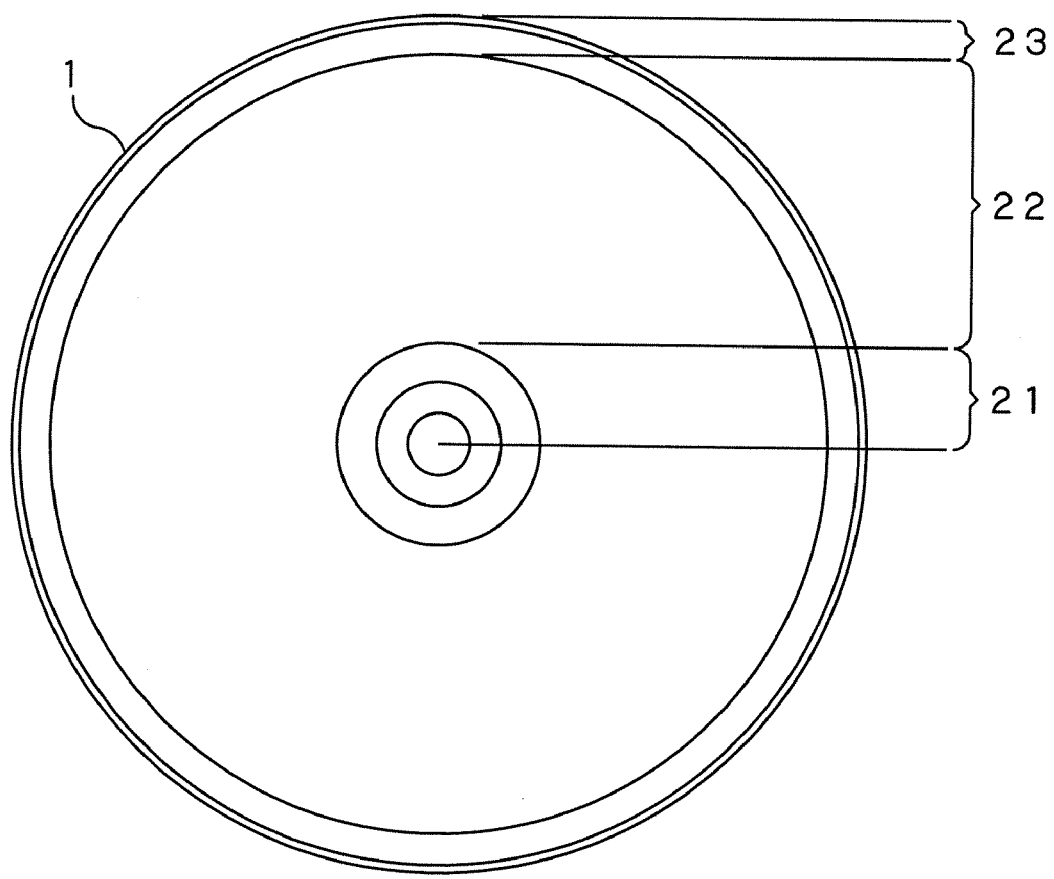
FIG. 10 is a schematic plan view of an optical disc according to the present invention, showing the disc layout thereof.

Now, the disc layout of the optical disc 1 will be described by referring to FIG. 10.

The optical disc 1 has a lead-in zone 21, a data zone 22 and a lead-out zone 23 arranged in the mentioned order from the inner peripheral side.

The lead-in zone 21 is formed within a range located inside relative to a radius of 24 mm from the center. Copy protection key information (BMID) is recorded in an annular region defined by radii of 22.3-23.1 mm from the center and disc management information is recorded in an annular region defined by 23.1-24 mm. The annular region defined by radii of 24-58 mm from the center is the data zone and the annular region defined by radii of 58-58.5 mm from the center is the lead-out zone.

The data zone 22 is formed in an annular region defined by radii of 24-58 mm from the center of the optical disc 1. The data zone 22 is a region where contents data that are the contents of one or more than one artistic works are recorded. Like the lead-in zone 21, the lead-out zone 23 is a region where disc management information is recorded. It also operates as a buffer area that an optical pickup can overrun when it seeks from the inner peripheral side to the outer peripheral side of the optical disc 1.

(Recording Apparatus for Preparing Original Disc)

Figure 11:
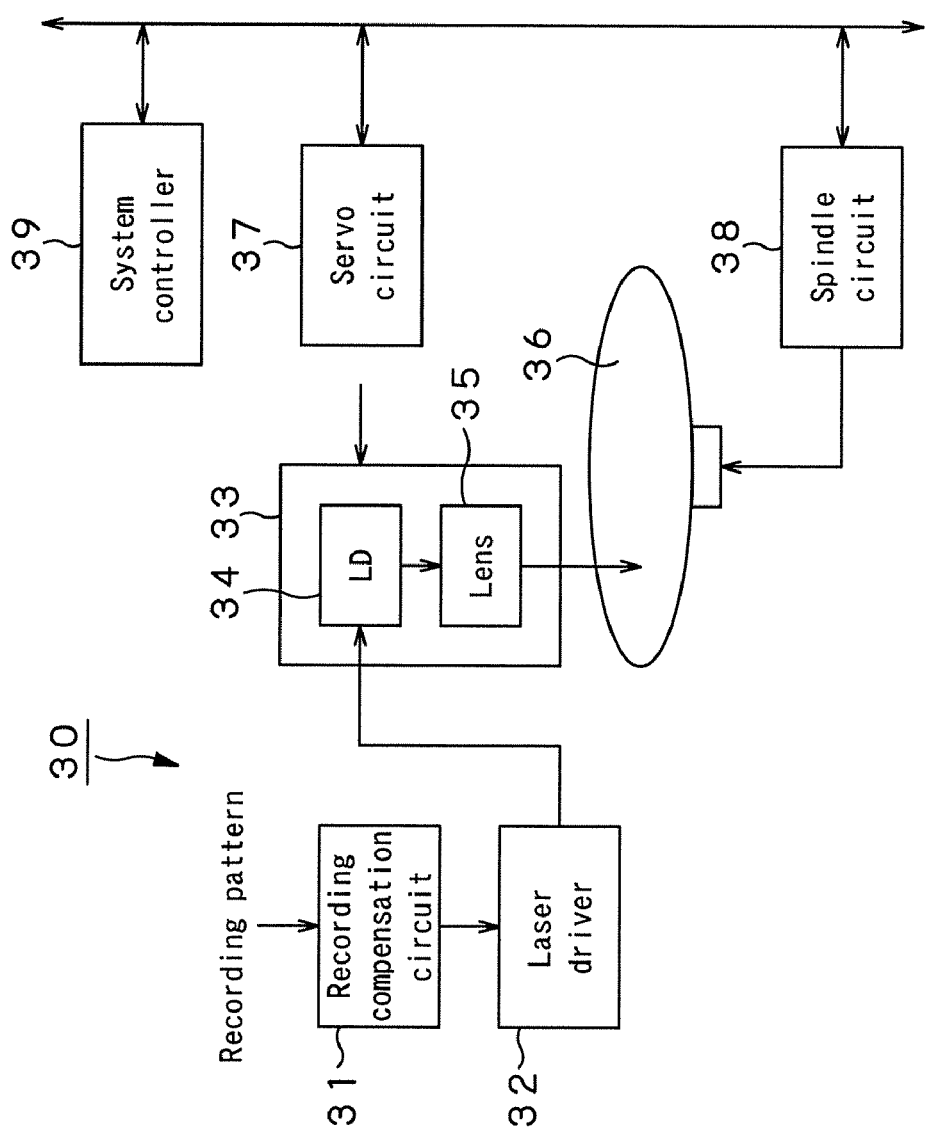
FIG. 11 is a schematic block circuit diagram of a recording apparatus to be used for manufacturing an original disc.

FIG. 11 shows a block circuit of a recording apparatus that can be used for preparing an original disc.

The bit sequence (the land-pit pattern) to be recorded on an optical disc 1 is input to the recording compensation circuit 31 of the recording apparatus 30. The recording compensation circuit 31 compensates the recording waveform typically to make it a pulse train in order to make the pits to be formed show a small jitter waveform at the time of reproduction. The waveform compensated for recording by the recording compensation circuit 31 is input to the laser driver 32. The laser driver 32 turns on/off the laser diode 34 of the optical head 33, focuses the light beam on the raw disc 36 by means of the object lens 35 and records one or more than one recording tracks on the raw disc 36. The servo circuit 37 operates for bi-axial actuator servo or mono-axial actuator servo and the seek operation of the optical head 34. The spindle circuit 38 controls the spindle motor for driving the raw disc 36 to rotate. The system controller 39 operates for communications with a 17PP data encoder and controls the blocks.

Reproduction of BMID

Now, the method of reproducing a BMID will be described below.

Figure 12:
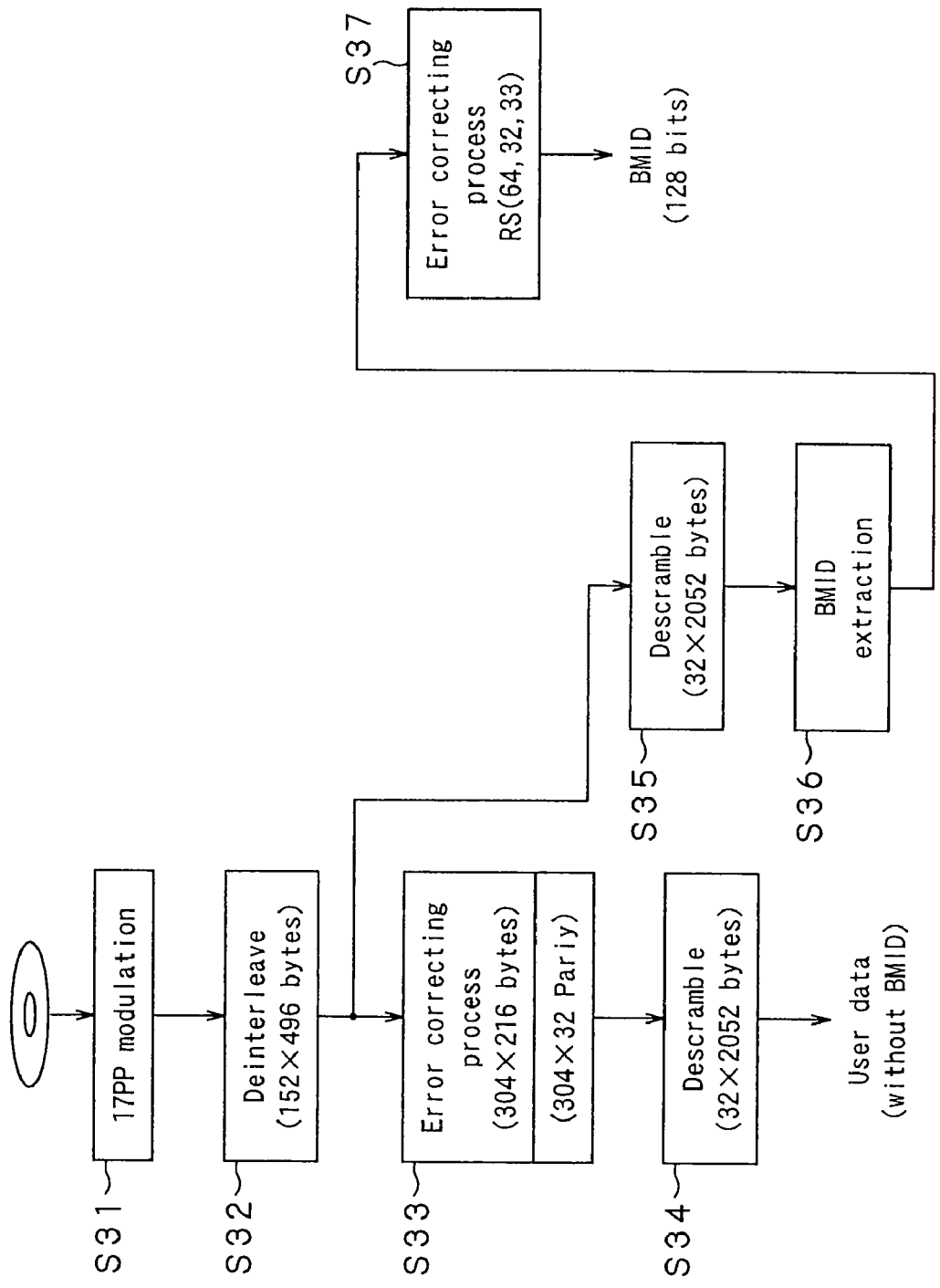
FIG. 12 is a flowchart of the BMID reproduction sequence.

FIG. 12 is a flowchart of reproduction of BMID.

Firstly, the optical disc 1 reproduces the signal of the cluster where BMID is recorded.

Figure 9:
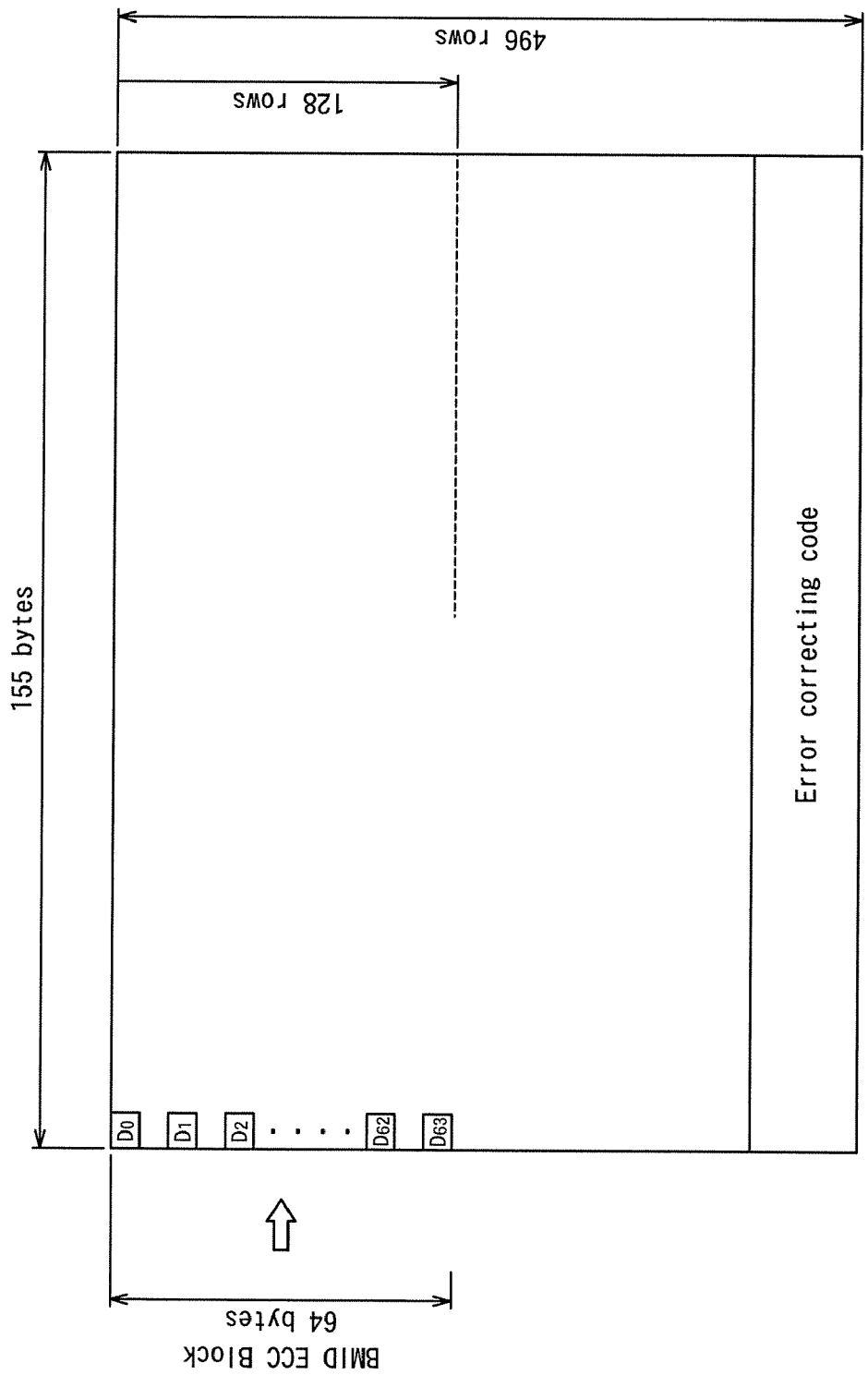
FIG. 9 is a schematic illustration of specific positions where BMID is replaced on an error correcting block (ECC cluster)

Then, in Step S31, the frame sync is detected from the signal to be reproduced for frame synchronization. Then, the modulated 17PP of the signal to be reproduced is demodulated according to the timing of the frame synchronization. After demodulating the 17PP, the data of the ECC cluster of FIG. 9 are reproduced.

Figure 13:
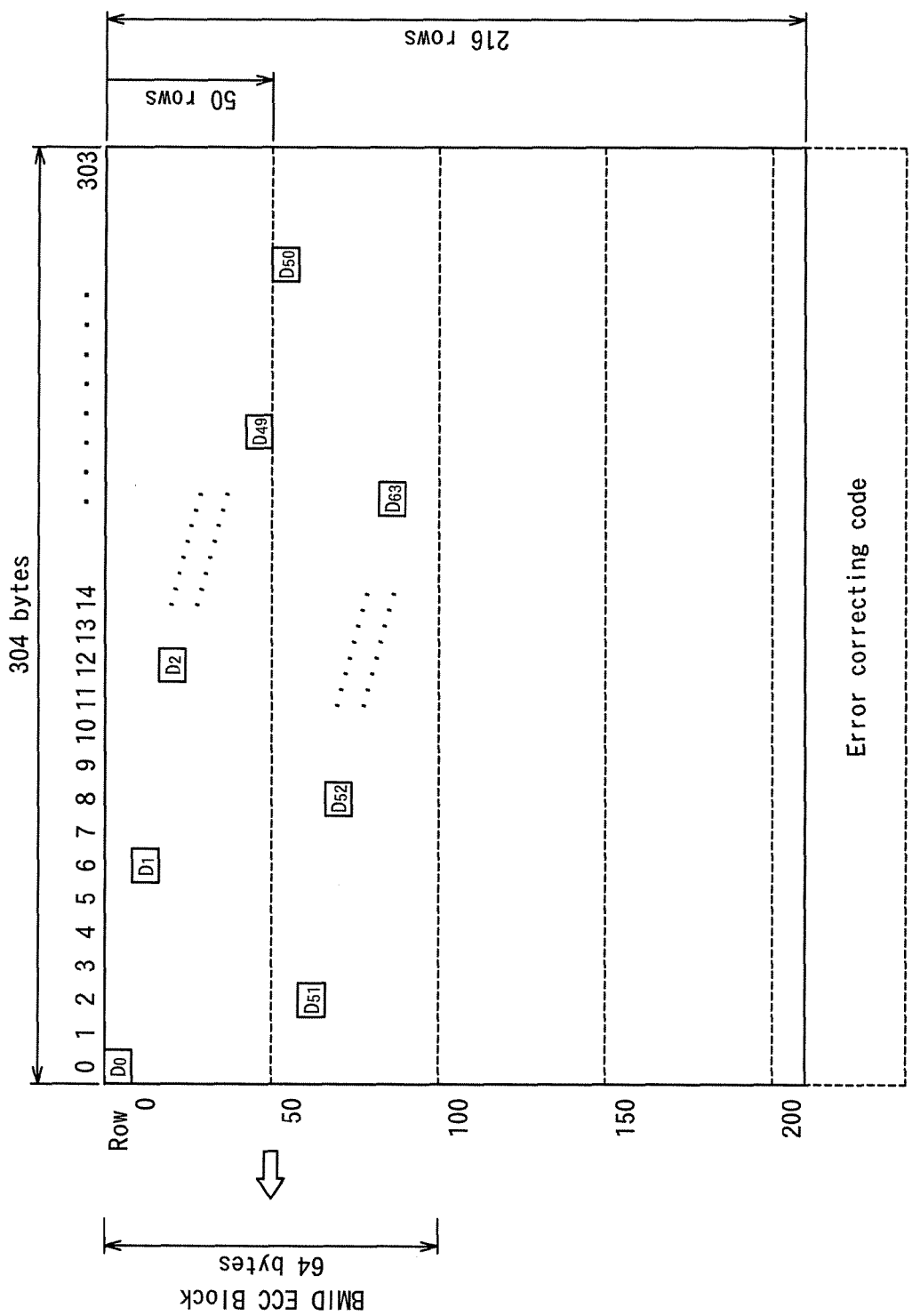
FIG. 13 is a schematic illustration of the positions on an error correcting block (ECC cluster) where BMID is extracted.

Subsequently, in Step S32, a deinterleave process is executed. In the deinterleave process, the arrangement is converted from the ECC cluster to the LDC block as shown below that is opposite to the first and second interleave processes of LDC described above to reproduce the data of the block of the error correcting code word (LDC) as shown in FIG. 13.

Firstly, a deinterleave process that corresponds to the second interleave process is executed. If the frame number is N, each of the symbols in the frame is shifted rightward by the number of symbols equal to (quotient of N×(0−495/2×3)). In other words, each of the symbols of the frames with frame numbers 0 and 1 is shifted rightward by 0 symbols and each of the symbols of the frames with frame numbers 2 and 3 is shifted rightward by 3 symbols, whereas each of the symbols of the frames with frame numbers 4 and 5 is shifted rightward by 6 symbols.

Then, a deinterleave process that corresponds to the first interleave process is executed. After the first deinterleave process, the symbols of the even-numbered rows of the ECC block such as 0, 2, . . . are arranged at the symbol positions of the error correcting code words (LDC) of the even-numbered columns of the LCD block such as 0, 2, . . . . Similarly, the symbols of the odd-numbered rows of the ECC block such as 1, 3 . . . are arranged at the symbol positions of the error correcting code words (LDC) of the odd-numbered columns of the LCD block such as 1, 3, . . . .

Subsequently, the process of Step S33 and that of Step S34 are executed when the user data are to be reproduced, whereas the processes from that of Step S35 and on are executed when the BMID is reproduced.

When reproducing the user data, an error correcting process is executed on each of the 304 error correcting code words (LDC) of the LDC block in Step S33.

Thereafter, in Step S34, a descramble process is executed. The data of 32 sectors and the added EDC are descrambled by means of a descramble method using a PSN (physical sector number) that is an address as seed.

After the descramble process, the EDC is checked in each of the 32 sectors and the user data are reproduced.

A symbol (1 byte data) of the BMID data string is recorded at most in each of the error correcting code words (LDC) in the user data.

As an error correcting process is executed on the error correcting code words (LDC) of the user data, the BMID data string is processed as error in the error correcting process of LDC and the user data are corrected and reproduced. The BMID block data is not reproduced. As a result, it is possible for the BMID to prevent the reproduced data of a disc from being copied on a hard disc once and then on a write once read many type recording mediums to produce so-called casual copies. The reproduced data of the optical disc 1 are subjected to an error correcting process and output from the ATAPIF of a replay apparatus so that the BMID is not copied.

When, on the other hand, BMID is reproduced, a descramble process is executed in Step S35 without executing the error correction decoding process of Step S33.

Subsequently, in Step S36, the BMID data string of 64 bytes is extracted from the data frame of 32×2,052 bytes.

Thereafter, in Step S37, an error correcting process is executed on the BMID data string. As a result, information of 16 bytes, 128 bits are reproduced as BMID.

The error correcting process of the BMID data can be executed by means of hardware same as the one used for the error correcting process executed on the user data.

(Disc Replay Apparatus)

Now, a disc replay apparatus to which the present invention is applicable for replaying an optical disc 1 according to the present invention will be described below.

Figure 14:
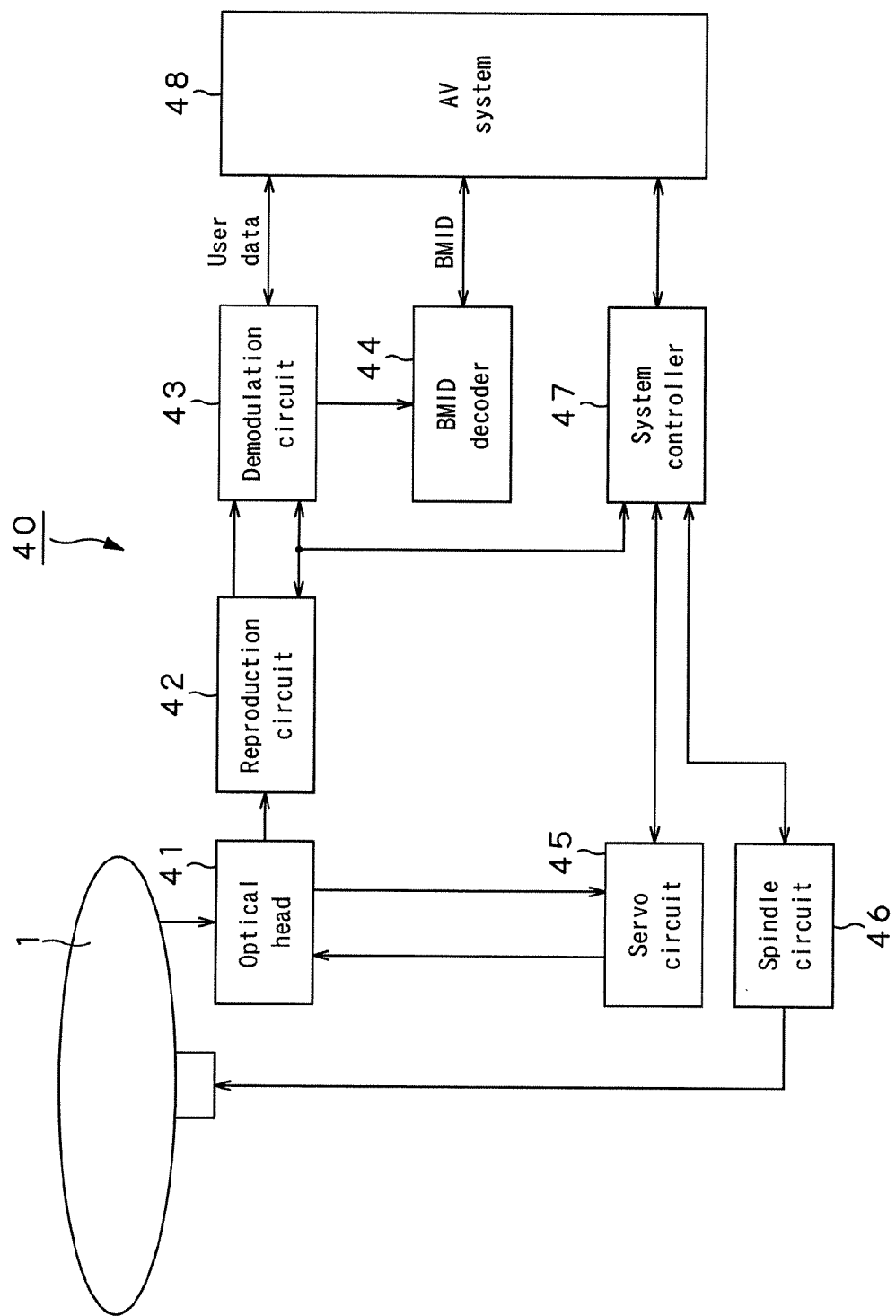
FIG. 14 is a schematic block circuit diagram of an optical disc replay apparatus according to the present invention.

FIG. 14 is a schematic block diagram of a disc replay apparatus 40 to which the present invention is applicable.

The disc replay apparatus 40 comprises an optical head 41, a reproduction circuit 42, a demodulation circuit 43, a BMID decoder 44, a servo circuit 45, a spindle circuit 46, a system controller 47 and an AV system 48.

The optical head 41 has an optical system including a laser diode, a reproduction optical detector for detecting signals to be reproduced and error signals from reflected light, a bi-axial actuator and so on and is adapted to reproduce the signals recorded on an optical disc 1.

The reproduction circuit 42 receives the signals to be reproduced output from the optical head 41 and performs operations such as PLL on the reproduced signals to reproduce binarized signals.

The demodulation circuit 43 executes a demodulation process of modulating 17PP, a deinterleave process, a decoding process of error correcting codes and a descramble process. The modulated 17PP data are demodulated by the demodulation process of modulated 17PP. Interleaved data are deinterleaved in the deinterleave process in order to return the interleaved data to the error correcting code sequence before the recording. Error correcting codes are subjected to an error correction decoding process. The demodulation circuit 43 reproduces address information and also checks error detection codes.

The BMID decoder 44 extracts a BMID data string from a specific error correcting block obtained without an error correcting process at the demodulation circuit 43 and executes an error correcting process on the BMID data string. The BMID data string is supplied to the AV system 48 after the error correcting process.

The servo circuit 45 is a circuit adapted to operate for the servo control of the bi-axial actuator of the optical head 41 and also for the seek control of the optical head 41.

The spindle circuit 46 controls the spindle motor for driving the optical disc 1 to rotate.

The system controller 47 communicates with the AV system 48 and controls the blocks.

The AV system 48 controls the display and output of the music and the images reproduced from the optical disc 1 and also the entire system.

For example, when reproducing BMID, a replay command is sent from the AV system 48 to the system controller 47. The system controller 47 acquires address information from the demodulation circuit 43 and causes the servo circuit 45 to operate for seek control so as to move the optical head 41 to the address position of the cluster where BMID is recorded and acquires a signal from the address.

The signal to be reproduced that is obtained from the cluster where the BMID is recorded is supplied to the reproduction circuit 42 from the optical head 41 and reproduced. The reproduced data is then sent to the demodulation circuit 43. The demodulation circuit 43 demodulates the user data recorded in the cluster where the BMID is recorded. The demodulated user data is corrected for error. The user that is corrected for error is subjected to an error detection and check process. The BMID data that is contained in the user data is corrected to become user data due to the error correction process of the user data. In other words, the BMID is extinguished and can no longer be acquired from the user data. Thus, if the user data is copied to some other medium, the BMID is not copied.

The BMID data string contained in the demodulated user data is sent from the demodulation circuit 43 to the BMID decoder 44 before the error correction process. Then, it is corrected for error and decoded by the BMID decoder 44. The decoded BMID is then sent from the BMID decoder 44 to the AV system 48.

When an AV stream is reproduced, a reproduction command is sent from the AV system 48 to the system controller 47. The system controller 47 acquires address information from the demodulation circuit 43 and has the servo circuit 45 operate for seek control and the optical head 41 move to the address position of the cluster where the AV stream is recorded so as to acquire the signal from the address.

The signal to be reproduced that is acquired from the cluster where the AV stream is recorded is then supplied from the optical head 41 to the reproduction circuit 42 and reproduced there. The reproduced data is demodulated by the demodulation circuit 43 and the demodulated bit stream is corrected for error. The bit stream that is corrected for error is subjected to an error detection and check process. The bit stream that is subjected to error detection and check process is then sent to the AV system 48 as reproduced video bit stream.

Recordable Disc Where BMID is Recorded

Now, an operation of recording BMID on an optical disc, which may be a Blu-ray™ disc, where the user can record data, will be described below.

Figure 15:
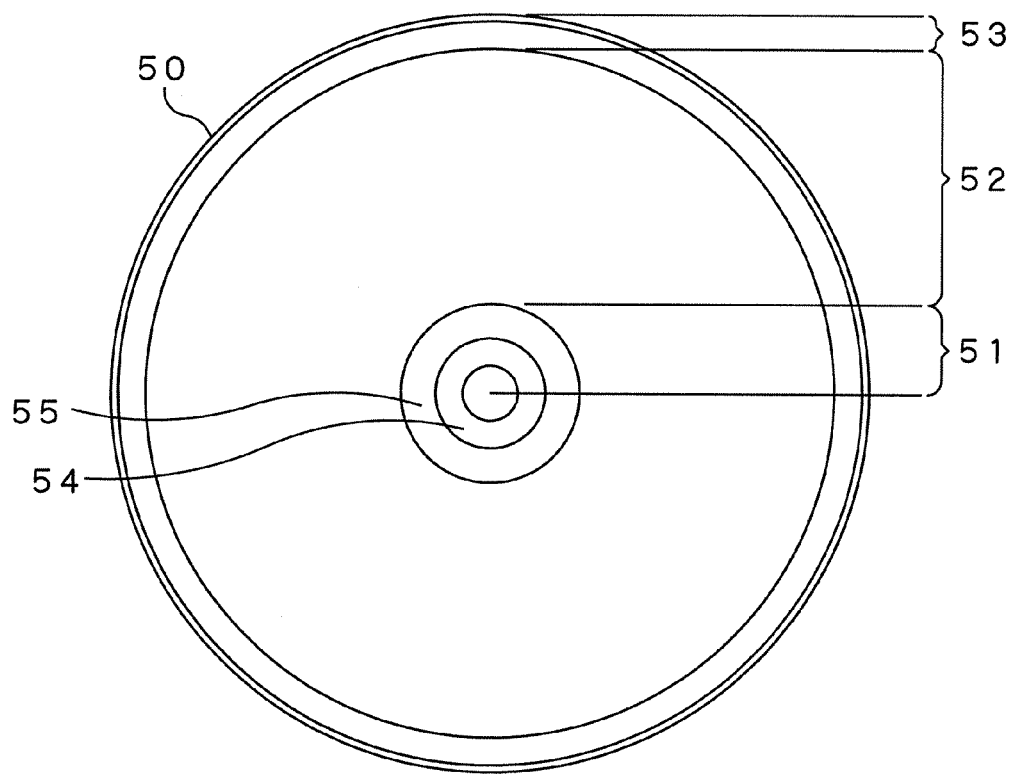
FIG. 15 is a schematic plan view of a recordable optical disc, showing the disc layout thereof.

FIG. 15 is a schematic illustration of the disc layout of a recordable optical disc (optical disc for recording 50).

The optical disc for recording 50 has a lead-in zone 51, a data zone 52 and a lead-out zone 53 arranged in the mentioned order from the inner peripheral side.

The lead-in zone 51 is formed within a range located inside relative to a radius of 24 mm from the center. A prerecording data zone 54 is formed in an annular region defined by radii of 22.3-23.1 mm from the center. A test write area and a defect management area are formed in an annular region defined by radii of 23.1-24 mm from the center.

The data zone 52 is formed in an annular region defined by radii of 24-58 mm from the center of the optical disc 1. The lead-out zone 53 is formed in annular region defined by radii of 58-58.5 mm from the center.

The prerecording data zone 54 is a region (PB zone) dedicated to reproduction.

All the regions other than the prerecording data zone 54 are regions (rw zone) where data can be recorded by means of phase change marks.

The recording conditions of the disc and other pieces of information are prerecorded on the prerecording data zone 54 by wobbling the spiral groove formed on the disc for tracking purposes.

The test write area is used to define the conditions such as the recording power and the reproduction power for recording and reproducing phase change marks. The defect management area is used to record and reproduce information for managing defect information.

The data zone 52 is a region where the user actually records and reproduces data.

Like the lead-in zone 51, the lead-out zone 53 is a defect managing area where information for managing defect information is recorded and reproduced. It also operates as a buffer area that an optical pickup can overrun when it seeks from the inner peripheral side to the outer peripheral side of the optical disc 50.

While the optical disc 50 is described as rewritable disc where data are recorded on and reproduced from a phase change recording film, BMID may alternatively be recorded on a write once read many type disc where data are recorded on and reproduced from a write once type recording film.

The information to be used to find out the recording conditions of the disc is recorded in advance on the prerecording data zone 54 by wobbling the spiral groove formed on the disc.

BMID is also recorded on the prerecording data zone 54.

The copy protection key information contained in the BMID and prerecorded on the recording optical disc 50 typically includes the following.

The drive manufacturers and the disc manufacturers who do businesses are registered to a management organization for optical discs. Each of the drive manufacturers and the disc manufacturers are provided with a drive key or a medium key showing that the manufacturer is registered to the management organization. A disc sold from a registered disc manufacturer carries the disc key of the disc manufacturer that is contained in the BMID recorded on the disc. Similarly, a disc on which information is recorded by means of a drive prepared by a registered drive manufacturer carries the drive key of the drive manufacturer that is contained in the BMID recorded on the disc.

Assume that the medium key or the drive key is stolen by hacking. The drive key or the medium key stolen by hacking is retained by the drive as copy protection key. Therefore, the disc carrying the BMID obtained by hacking cannot be used for signal recording/reproduction since the BMID is authenticated by the drive.

Other Example of Replacement of BMID Symbols

Now, a modification that can be made to the process of replacing BMID symbols (Step S17) will be described below.

The BMID data string of 64 bytes may be inserted into any error correcting code words so long as it is inserted to predetermined 64 error correcting code words (LDC) of a block (error correcting code words of 304 columns).

A predetermined symbol (byte) of an error correcting code word (LDC) formed by 248 bytes (symbols) is replaced by a predetermined symbol (byte) of the BMID data string. It does not matter where the symbol position is.

Figure 16:
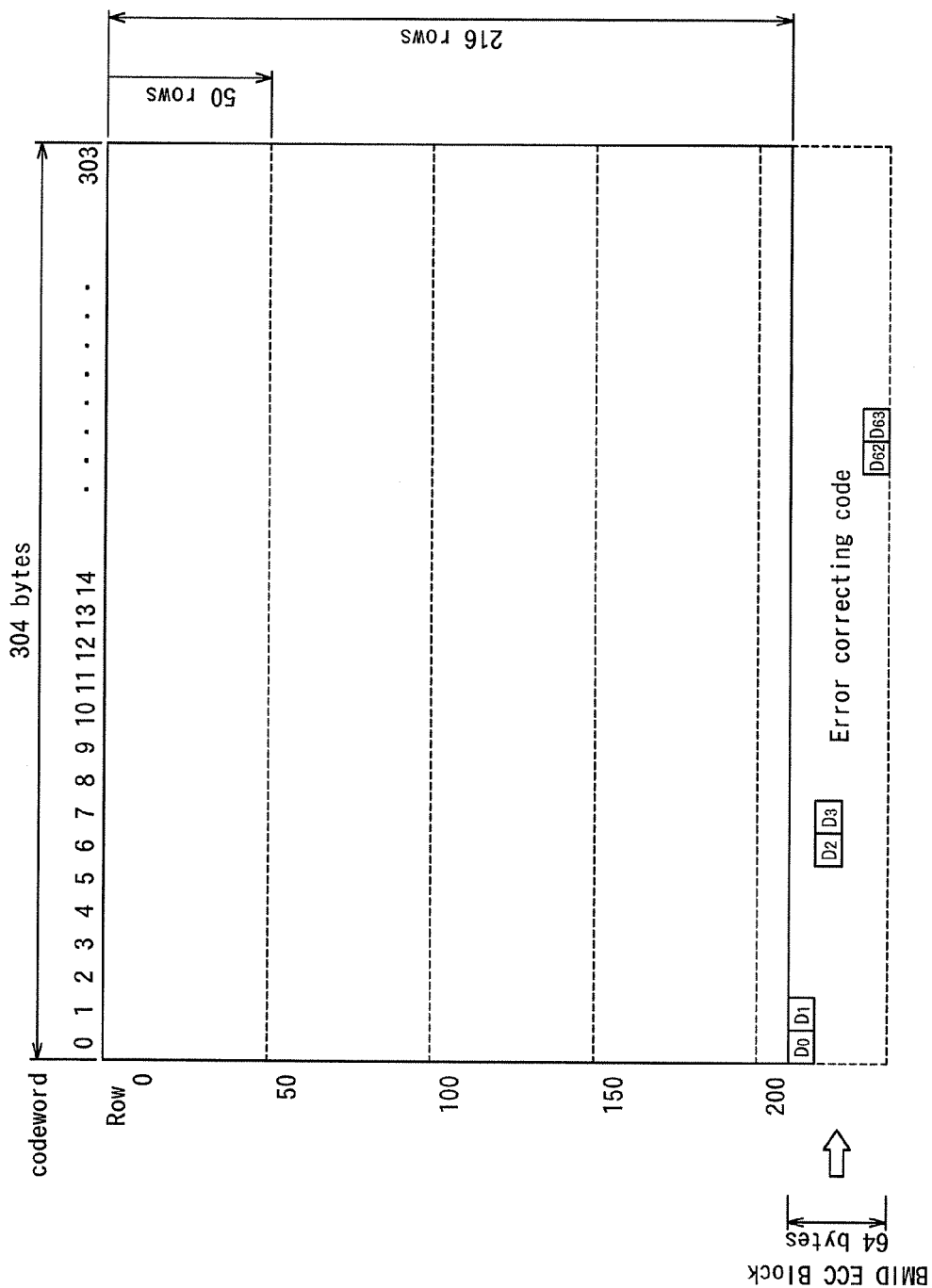
FIG. 16 is a schematic illustration of specific positions where BMID is replaced (when arranged on an error correcting code) on an error correcting cording word (LDC) of the user data.
Figure 17:
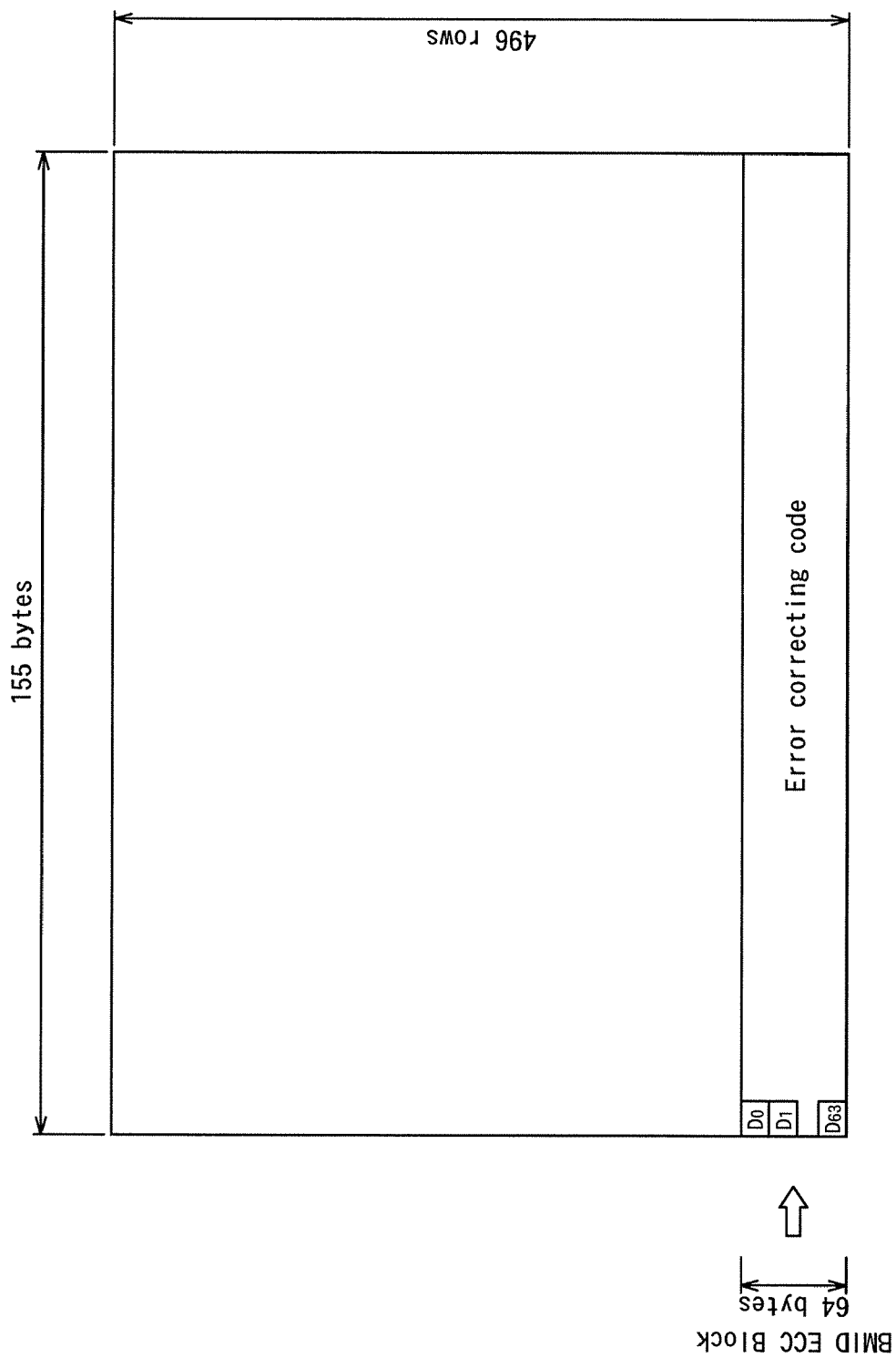
FIG. 17 is a schematic illustration of specific positions where BMID is replaced (when arranged on an error correcting code) on an error correcting block (ECC cluster).

For example, the symbol may be replaced by a parity (error correcting code) part as shown in FIG. 16. Referring to FIG. 16, the symbol (D0) of the 1-st byte of the BMID data string is replaced by the symbol of the 217-th byte (Row=216) of the 1-st error correcting code word (LDC) (codeword=0) and the symbol (D1) of the 2-nd byte of the BMID data string is replaced by the symbol of the 217-th byte (Row=216) of the 2-nd error correcting code word (LDC) (codeword=1), while the symbol of the 3-rd byte of the BMID data string is replaced by the symbol of the 218-th byte (Row=217) of the 3-rd error correcting code word (LDC) (codeword=2).

As a result of replacing the BMID data string, the insertion positions of the BMID data string after an interleave process are located at the leading symbols (symbols immediately after the frame syncs) of the 433-rd, 433-rd, 435-th, . . . , 496-th rows.

Thus, it is sufficient for the process of replacing symbols that the BMID data string is replaced at specific positions in a specific error correcting block in such a way that the number of symbols of the BMID data string contained in one (248 bytes) of the error correcting code word (LDC) of the user data is 1 at most regardless if the positions involve a parity part.

The invention claimed is:

1. A method of manufacturing an optical disc carrying a recorded data sequence produced by executing an error correction coding process and subsequently a modulation process on user data, the method comprising:
   generating first error correcting code words, each including user data of a predetermined number of bytes and an error correcting code for the user data of a predetermined number of bytes by executing an error correction coding process on the user data of a predetermined number of bytes;

producing a recording/reproduction unit by interleaving the first error correcting code words;

generating second error correcting code words, each including additional information and an error correcting code for the additional information by executing the error correction coding process on the additional information;

replacing a symbol at a predetermined position in the recording/reproduction unit with a symbol contained in one of the second error correcting code words;

executing a modulation process on the recording/reproduction unit; and producing an optical disc carrying the modulated recording/reproduction unit recorded thereon so as to have the recording/reproduction unit containing the symbol contained in the one of the second error correcting code words recorded in a predetermined region dedicated to reproduction.

2. The method of manufacturing an optical disc according to claim 1, wherein, in the replacing includes replacing a symbol contained in one of the first error correcting code words by a symbol contained in one of the second error correcting code words.

3. The method of manufacturing an optical disc according to claim 1, wherein the error correcting codes for the user data of a predetermined number of bytes and the additional information are Reed-Solomon codes where the code distance is made equal to 33.

4. The method of manufacturing an optical disc according to claim 1, wherein the additional information includes copy protection key information of the user data.

5. The method of manufacturing an optical disc according to claim 1, wherein the optical disc is a disc dedicated to reproduction.

6. An apparatus for manufacturing an optical disc carrying a recorded data sequence produced by executing an error correction coding process and subsequently a modulation process on user data and dedicated to reproduction, the apparatus configured to:

generate first error correcting code words, each including user data of a predetermined number of bytes and an error correcting code for the user data of a predetermined number of bytes by executing an error correction coding process on the user data of a predetermined number of bytes;

produce a recording/reproduction unit by interleaving the first error correcting code words;

generate additional information to the user data;

generate second error correction code words, each including the additional information and an error correcting code for the additional information by executing the error correction coding process on the additional information; and replace a symbol at a predetermined position in the specific recording/reproduction unit with a symbol contained in one of the second error correcting code words.

7. The apparatus for manufacturing an optical disc according to claim 6, wherein a symbol contained in one of the first error correcting code words is replaced by a symbol contained in one of the second error correcting code words.

8. The apparatus for manufacturing an optical disc according to claim 6, wherein the error correcting codes for the user data of a predetermined number of bytes and the additional information are Reed-Solomon codes where the code distance is made equal to 33.

9. The apparatus for manufacturing an optical disc according to claim 6, wherein the additional information includes copy protection key information of the user data.

10. The apparatus for manufacturing an optical disc according to claim 6, wherein the optical disc is a disc dedicated to reproduction.

11. An optical disc carrying a bit sequence recorded thereon, the bit sequence being generated by generating first error correcting code words, each including user data of a predetermined number of bytes and an error correcting code for the user data of a predetermined number of bytes by executing an error correction coding process on the user data of a predetermined number of bytes, producing a recording/reproduction unit by interleaving the first error correcting code words, generating second error correction code words, each including additional information and an error correcting code for the additional information by executing the error correction coding process on the additional information, replacing a symbol at a predetermined position in the recording/reproduction unit with a symbol contained in one of the second error correcting code words and executing a modulation process on the recording/reproduction unit;

the recording/reproduction unit containing the symbol contained in the one of the second error correcting code words recorded in a predetermined region dedicated to reproduction.

12. The optical disc according to claim 11, wherein a symbol contained in one of the first error correcting code words is replaced by a symbol contained in one of the second error correcting code words.

13. The optical disc according to claim 11, wherein the error correcting codes for the user data of a predetermined number of bytes and the additional information are Reed-Solomon codes where the code distance is made equal to 33.

14. The optical disc according to claim 11, wherein the additional information includes copy protection key information of the user data.

15. The optical disc according to claim 11, wherein the optical disc is a disc dedicated to reproduction.

16. An optical disc replay apparatus comprising:

a reproduction circuit configured to reproduce a signal from an optical disc carrying a bit sequence recorded thereon, the bit sequence being generated by generating first error correcting code words, each including user data of a predetermined number of bytes and an error correcting code for the user data of a predetermined number of bytes by executing an error correction coding process on the user data of a predetermined number of bytes, producing a recording/reproduction unit by interleaving the first error correcting code words by a predetermined number, generating second error correction code words, each including additional information and an error correcting code for the additional information by executing the error correction coding process on the additional information, replacing a symbol at a predetermined position in the recording/reproduction unit with a symbol contained in one of the second error correcting code words and executing a modulation process on the recording/reproduction unit, the recording/reproduction unit containing the symbol contained in the one of the second error correcting code words being recorded in a predetermined region dedicated to reproduction;

a demodulation circuit configured to executing a demodulation process corresponding to the modulation process on the signal reproduced by the reproduction circuit to generate recording/reproduction units; and a system controller configured to execute an error correction decoding process and an additional information decoding process;

the system controller configured to output data by executing an error correction decoding process on each first error correcting code words for the modulated recording/reproduction unit when outputting the user data and extract a second error correcting code word from a predetermined position of a recording/reproduction unit not subjected to an error correction decoding process, execute an error correction decoding process on the extracted second error correcting code word, and extract the data obtained by the error correction decoding process when outputting the additional information.

17. The optical disc replay apparatus according to claim 16, wherein the demodulation circuit is configured to decode both the first error correcting code word and the second error correcting code word.

18. An optical disc replay method comprising:

reproducing a signal from an optical disc carrying a bit sequence recorded thereon, the bit sequence being generated by generating first error correcting code words, each including user data of a predetermined number of bytes and an error correcting code for the user data of a predetermined number of bytes by executing an error correction coding process on the user data of a predetermined number of bytes, producing a recording/reproduction unit by interleaving the first error correcting code words by a predetermined number, generating second error correction code words, each including additional information and an error correcting code for the additional information by executing the error correction coding process on the additional information, replacing a symbol at a predetermined position in the recording/reproduction unit with a symbol contained in one of the second error correcting code words and executing a modulation process on the recording/reproduction unit, the recording/reproduction unit containing the symbol contained in the one of the second error correcting code words being recorded in a predetermined region dedicated to reproduction;

executing a demodulation process corresponding to the modulation process on the reproduced signal; and executing an error correction decoding process on each first error correcting code word for the modulated recording/reproduction unit to output data when outputting the user data; and extracting a second error correcting code word from a predetermined position of a recording/reproduction unit not being subjected to an error correction decoding process, executing an error correction decoding process on the extracted second error correcting code word, and extracting the data obtained by the error correction decoding process, when outputting the additional information.

19. The optical disc replay method according to claim 18, wherein both the first error correcting code word and the second error correcting code word are decoded by the same demodulation circuit.

* * * * *